Figure 1:
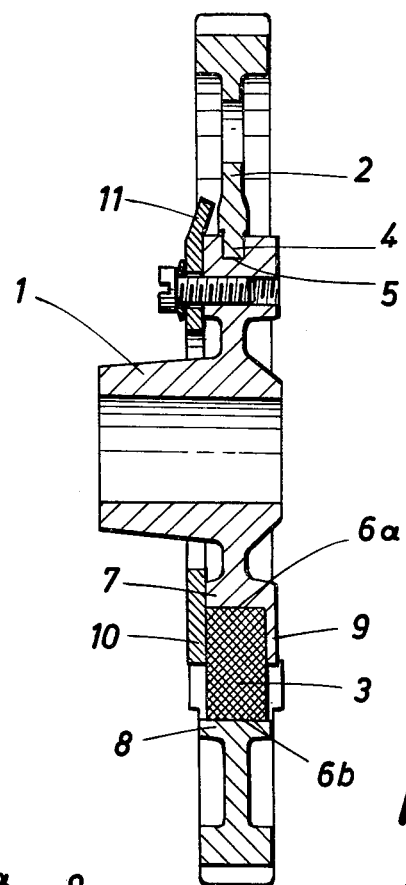

United States Patent [19]

Krebs et al.

[11] 4,197,759

[45] Apr. 15, 1980

[54] GEAR

[75] Inventors: Jörg Krebs; Peter Resele, both of Graz, Austria

[73] Assignee: Steyr-Daimler-Puch Aktiengesellschaft, Vienna, Austria

[21] Appl. No.: 895,543

[22] Filed: Apr. 12, 1978

[30] Foreign Application Priority Data

Jan. 20, 1978 [AT] Austria ................................ 410/78

[51] Int. Cl.² ............................................. F16H 55/12
[52] U.S. Cl. .................................... 74/447; 403/226; 403/372
[58] Field of Search ................. 74/411, 446, 447, 574, 74/409, 439, 440, 443, 461; 403/226, 372; 64/27 NM, 30 E

[56] References Cited

U.S. PATENT DOCUMENTS

| 1,424,203 | 8/1922 | Keller | 74/447 |
| 2,972,904 | 2/1961 | Troyer | 74/574 |
| 3,670,593 | 6/1972 | Troyer | 74/574 |

FOREIGN PATENT DOCUMENTS 694883 7/1953 United Kingdom .

Primary Examiner—C. J. Husar
Assistant Examiner—Conrad Berman
Attorney, Agent, or Firm—Kurt Kelman

[57] ABSTRACT

A gear comprises a hub and a gear ring mounted thereon, each formed with peripherally spaced apertures and interlocking elements extending peripherally between adjacent apertures to hold the hub and gear ring against axial movement relative to each other. The apertures of the hub and gear ring register. Torque is transmitted between the hub and gear ring by a plurality of first abutments on the hub which have radially outwardly facing surfaces adjoining respective apertures therein, a plurality of second abutments on the gear ring which have radially inwardly facing surfaces adjoining respective apertures therein and radially aligned with respective outwardly facing surfaces, and a plurality of prestressed elastomeric spring elements disposed in the registering apertures. Each spring element engages the radially aligned surfaces and is retained in the apertures by a retaining disc secured to the hub and engaging the spring element on one side of the gear.

10 Claims, 5 Drawing Figures

GEAR

This invention relates to a gear which comprises a hub, a gear ring mounted on said hub, and prestressed spring elements disposed between and adapted to transmit torque between said hub and gear ring, said hub and gear ring having peripherally extending, arcuate groove-forming portions and peripherally extending, arcuate ribs which interengage with said groove-forming portions to hold said hub and gear ring against an axial movement relative to each other. The hub and gear ring are formed between said groove-forming portions and ribs with apertures which contain prestressed spring elements adapted to transmit torque between said hub and gear ring.

In spite of its spring elements, such a torsionally elastic gear has a relatively small axial thickness and permits the hub and gear ring to be connected by a joint which is similar to a bayonet joint before the spring elements are inserted. To form said joint, the arcuate ribs are inserted through the apertures and can then enter the arcuate groove-forming portions by a relative rotation of the hub and gear ring. A known gear of the type described has been disclosed in British Pat. No. 694,883 and comprises spring elements consisting of helical compression springs of steel. Such steel springs have the disadvantage that they must be provided with spring plates in order to ensure a uniform spring force action and to avoid an exertion of eccentric forces. On the other hand, such spring plates add to the structural expenditure and render the assembly more difficult. Besides, the chordally extending coil springs do not radially bias the hub and gear ring so that a radial backlash between the gear ring and hub is inevitable and although said radial backlash may be small it may give rise to unpleasant noise. Besides, the sound generated by the meshing teeth and transmitted by the gear ring cannot be attenuated by the steel springs but is fully transmitted from the gear ring to the hub. Besides, a progressively decreasing spring rate cannot be obtained with conventional helical compression springs.

Whereas it is known to use rubber members as torque-transmitting rubber springs, these are used only in torsionally elastic couplings, in which one member has coupling elements which protrude parallel to the axis and interlock with rubber elements inserted into the other member of the coupling so that the two coupling members must be axially aligned and the overall axial dimension of the entire coupling is excessive for numerous purposes.

It is an object of the invention to eliminate these disadvantages and so to improve the gear which has been described first hereinbefore that the structure is simplified, the manufacturing and assembling expenditure is decreased, and a progressively decreasing torsion spring rate and an effective attenuation of operating noise are effected.

This object is accomplished according to the invention in that the spring elements consist of rubber, and the hub and the gear ring are integrally formed at the edges of the apertures with abutments for the rubber spring elements, and said spring elements of rubber are axially retained between end walls, which at least partly cover said apertures, and a retaining disc secured to the hub, or between two such retaining discs.

Compared to spring elements of steel, the rubber spring elements provide for an improved progressive decrease of the torsion spring rate. The rubber spring elements inserted in the apertures are prestressed also radially so that they radially bias the hub and gear ring and a radial backlash between said two members cannot generate additional noise. On the contrary, the gear ring is held by the rubber spring elements in such a manner that a direct contact between the hub and gear ring is substantially avoided so that the operating sound which is due to the meshing of teeth is effectively attenuated. The abutments have a substantial area to ensure an effective transmission of force and to eliminate the need for separate spring plates. Spring elements of rubber can be made at much lower cost than compression springs of steel. Besides, they can be assembled much more easily because no spring plates have to be mounted. The retaining discs or the retaining disc and the end walls reliably hold the spring elements in an axial direction, on the one hand, and do not render the insertion of the rubber spring elements more difficult because the retaining disc or discs is or are secured to the hub when the rubber spring elements have been inserted.

According to an additional feature of the invention, the rubber spring elements consist of extruded elements which are preferably circular in cross-section. Such spring elements can be made in a particularly simple manner and at low cost.

In accordance with the invention, the abutments of substantial area, which are provided on the hub and on the gear ring, have end portions which are substantially at right angles to each other and are joined by an apex portion which is curved on a large radius. In such an arrangement, a rotation of the gear ring relative to the hub cannot cause an edge of an abutment to penetrate and injure the rubber spring element because the latter is held under initial stress between two parallel surfaces and may be only indented at the ends of these surfaces to form obtuse-angled indentations. Besides, a circular cylindrical rubber spring element can easily be deformed to the contour which is required in view of the angled configuration of the abutments.

According to a further feature of the invention, the retaining disc or at least one of the retaining discs has at least one radially protruding lug which extends between and is peripherally spaced apart from the abutments which adjoin adjacent apertures of the gear ring. Should the rubber spring elements be destroyed for any reason whatever, the lug will engage one of the abutments so that the hub and gear ring are positively coupled and the gear ring cannot spin on the hub.

Figure 3:
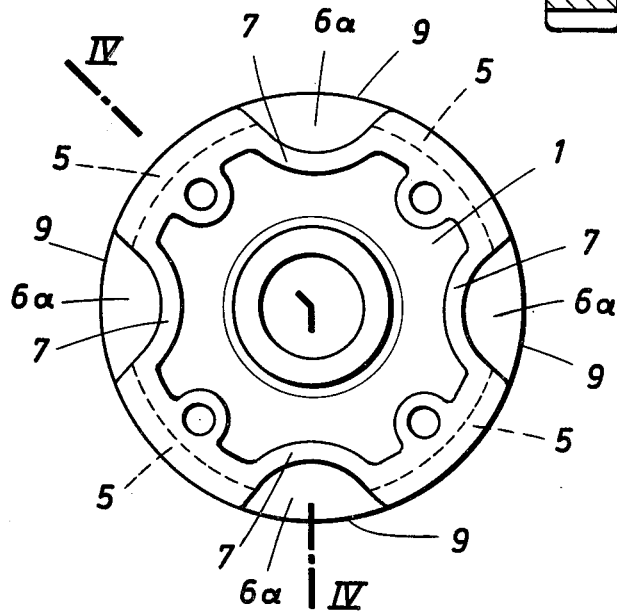
Figure 4:
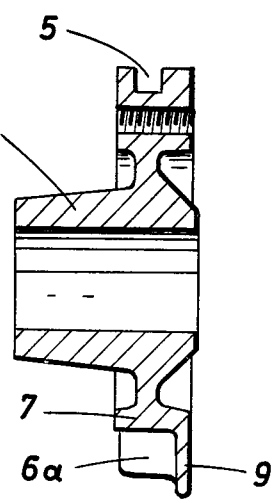
Figure 2:
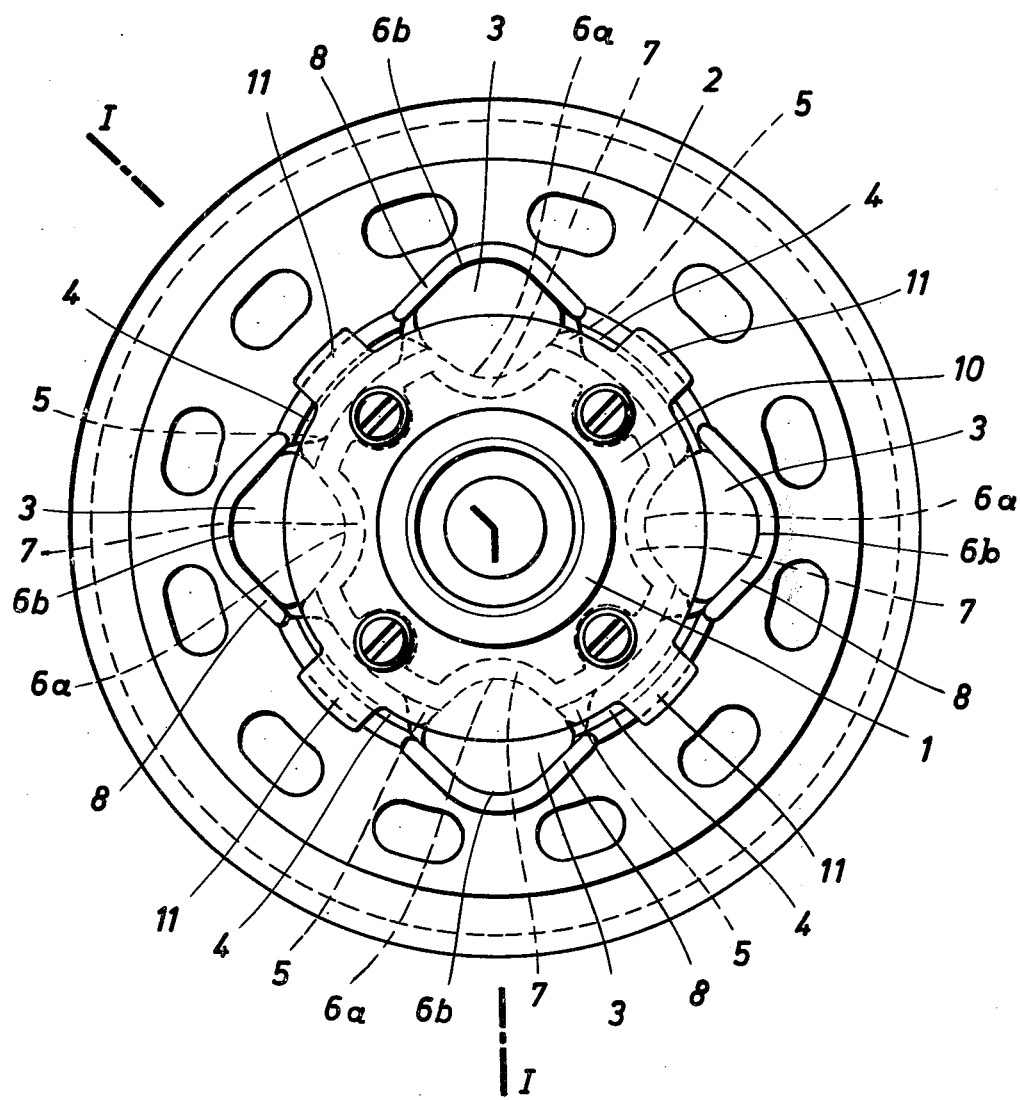
Figure 5:
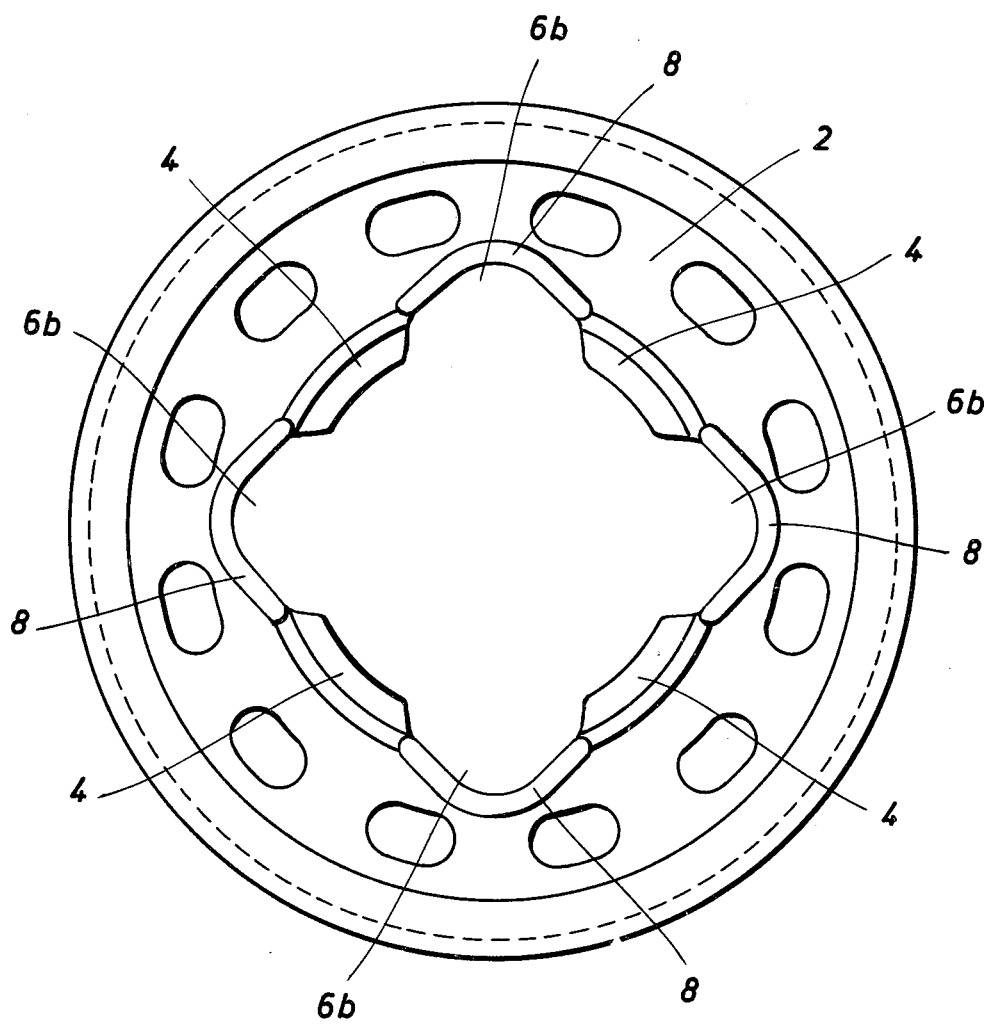

An embodiment of the invention is shown by way of example on the drawing, in which FIG. 1 is a sectional view taken on line I—I in FIG. 2 and showing a complete gear, FIG. 2 is an end view showing the gear, FIG. 3 is an end view showing the hub alone, FIG. 4 is a sectional view taken on line IV—IV of FIG. 3 and showing the hub, and FIG. 5 is an end view showing the gear ring.

The gear according to the invention comprises a hub 1, a gear ring 2, and prestressed spring elements 3, which are disposed between and transmit torque between the hub 1 and the gear ring 2. The gear ring 2 is rotatably mounted on the hub 1 and comprises peripherally extending arcuate ribs 4, which engage peripherally extending arcuate grooves 5 of the hub 1. The hub 1 is formed with apertures 6a between the arcuate grooves 5. The gear ring 2 is formed with apertures 6b between the arcuate ribs 4. Rubber spring elements 3 are disposed in the apertures 6a, 6b. At the periphery of the hub 1, the apertures 6a have a peripheral length which is larger than the peripheral length of the ribs 4 so that the arcuate ribs 4 can enter through the apertures 6a as the gear ring 2 is fitted on the hub 1. When the gear ring 2 is subsequently rotated through 45° relative to the hub 1, the ribs 4 will interengage with the grooves 5.

The hub 1 is integrally formed with abutments 7 at the edges of the apertures 6a. The gear ring 2 is integrally formed with abutments 8 at the edges of the apertures 6b. Each of the abutments 7 is axially larger than another portion of the hub 1. Each of the abutments 8 is axially larger than another portion of the gear ring 2. Each of the rubber spring elements 3 engages one of the abutments 7 and one of the abutments 8. The end portions of each of the abutments 7 and 8 extend substantially at right angles and are joined by an apex portion which is curved on a large radius.

The apertures 6a of the hub 1 are covered by end walls 9. The rubber spring elements 3 are axially retained between these end walls 9 and a retaining disc 10, which is screw-connected to the hub 1. The retaining disc 10 has radially outwardly protruding lugs 11, which extend between and are peripherally spaced apart from the abutments 8 at adjacent apertures 6b of the gear ring 2.

What is claimed is:

1. A gear which comprises
a hub formed with a plurality of peripherally spaced apart first apertures and with a plurality of first interlocking elements extending peripherally between adjacent ones of said first apertures,
a gear ring mounted on said hub and formed with a plurality of peripherally spaced apart second apertures, which communicate with respective ones of said first apertures, and further formed with a plurality of second interlocking elements extending peripherally between adjacent ones of said second apertures and interlocking with said first interlocking elements to hold said hub and gear ring against axial movement relative to each other,
torque-transmitting means for transmitting torque between said hub and gear ring, said torque-transmitting means comprising a plurality of first abutments formed on said hub and having radially outwardly facing surfaces adjoining respective ones of said first apertures, a plurality of second abutments formed on said gear ring and having radially inwardly facing surfaces adjoining respective ones of said second apertures and radially aligned with respective ones of said radially outwardly facing surfaces, and a plurality of prestressed elastomeric spring elements, each of which is disposed in one of said first apertures and in one of said second apertures which communicates with said one first aperture, each of said spring elements engaging said radially outwardly and radially inwardly facing surfaces adjoining said one first aperture and said one second aperture, respectively, and
retaining means axially retaining said spring elements in said first and second apertures and comprising a retaining disc secured to said hub and engaging said spring elements on one side of said gear.

2. A gear as set forth in claim 1, in which said first and second interlocking elements comprise arcuate ribs and arcuate groove-forming portions interengaging with said ribs.

3. A gear as set forth in claim 1, in which said retaining means comprise end walls which at least partly cover said apertures.

4. A gear as set forth in claim 1, in which each of said first apertures and the second aperture which communicates therewith are radially open toward each other.

5. A gear as set forth in claim 1, in which said spring elements are circular in cross-section when relaxed.

6. A gear as set forth in claim 1, in which
each of said radially outwardly and radially inwardly facing surfaces is concavely curved toward the aperture adjoined by said surface and has end portions which are substantially at right angles to each other.

7. A gear as set forth in claim 1, in which said retaining disc has at least one radially outwardly protruding lug, which extends between and is peripherally spaced from two adjacent ones of said second abutments.

8. A gear as set forth in claim 1, in which
said first and second interlocking elements comprise arcuate ribs and arcuate groove-forming portions interlocking with said ribs and
each of said first and second apertures has a larger peripheral extent than each of said ribs.

9. A gear as set forth in claim 1, in which
said radially outwardly facing surfaces are axially larger than another portion of said hub and
said radially inwardly facing surfaces are axially larger than another portion of said gear ring.

10. A gear as set forth in claim 9, in which said elastomeric spring elements are extruded elements.

* * * * *